(12) United States Patent
Honjo (10) Patent No.: US 11,530,743 B2
(45) Date of Patent: Dec. 20, 2022

(54) VEHICLE

(71) Applicant: HONDA MOTOR CO., LTD., Tokyo (JP)

(72) Inventor: Takuya Honjo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/549,145

(22) Filed: Dec. 13, 2021

(65) Prior Publication Data

US 2022/0221045 A1    Jul. 14, 2022

(30) Foreign Application Priority Data

Jan. 13, 2021    (JP) .............................. JP2021-003819

(51) Int. Cl.
*F16H 57/04*    (2010.01)
*B60K 11/02*    (2006.01)
*F01P 11/18*    (2006.01)
*F01P 3/00*    (2006.01)

(52) U.S. Cl.
CPC .......... *F16H 57/0413* (2013.01); *B60K 11/02* (2013.01); *F16H 57/0441* (2013.01); *F01P 11/18* (2013.01); *F01P 2003/006* (2013.01); *F01P 2031/18* (2013.01)

(58) Field of Classification Search
CPC . F16H 57/0413; F16H 57/0441; B60K 11/02; F01P 2003/006; F01P 2003/008; F01P 2031/18; F01P 11/18; F01P 7/165
See application file for complete search history.

(56) References Cited

U.S. PATENT DOCUMENTS 6,201,365 B1    3/2001    Hara et al.
6,323,613 B1 *  11/2001   Hara ...................... B60L 50/61
                                                    903/952

FOREIGN PATENT DOCUMENTS

JP    2001-238406 A    8/2001
JP    2017-087801 A    5/2017

* cited by examiner

*Primary Examiner* — Jacob M Amick
(74) *Attorney, Agent, or Firm* — Paratus Law Group, PLLC (57) ABSTRACT

A vehicle includes: an electric motor; and a temperature-control circuit through which a non-conductive temperature-control medium for temperature control for the electric motor circulates. The temperature-control circuit includes: a heat exchanger configured to exchange heat between the non-conductive temperature-control medium and a conductive temperature-control medium; and a pump driven in accordance with driving of the vehicle to circulate the non-conductive temperature-control medium. The temperature-control circuit further includes a liquid pressure holding unit configured to hold liquid pressure of the non-conductive temperature-control medium in the heat exchanger equal to or higher than a predetermined pressure.

7 Claims, 4 Drawing Sheets

VEHICLE

CROSS-REFERENCE TO RELATED APPLICATIONS

This application is based on and claims priority under 35 USC 119 from Japanese Patent Application No. 2021-003819, filed on Jan. 13, 2021, the contents of which are incorporated herein by reference.

TECHNICAL FIELD

The present invention relates to a vehicle including an electric motor and a temperature-control circuit through which a non-conductive temperature-control medium for temperature control for the electric motor circulates.

BACKGROUND ART

In the related art, there is a vehicle including an electric motor (for example, an electric machine) and a power conversion device. In general, since an electric machine and a power conversion device generate heat when driven, a vehicular temperature-control system configured to control a temperature of an electric machine or a power conversion device is provided with a vehicle including the electric machine and the power conversion device.

For example, JP2001-238406A discloses a vehicular temperature-control system including: a circulation path L through which oil circulates for cooling an electric motor M; a circulation path F through which cooling water circulates for cooling an inverter U; and a heat exchange unit (oil cooler C) configured to exchange heat between the cooling water flowing through the circulation path F and the oil flowing through the circulation path L. A radiator R is provided in the circulation path F, and the cooling water flowing through the circulation path F is cooled by the radiator R. The oil flowing through the circulation path L is cooled by the heat transfer between the cooling water flowing through the circulation path F and the oil flowing through the circulation path L in the heat exchange unit (oil cooler C). Therefore, in that vehicular temperature-control system, a radiator for cooling the oil is not necessary, and the cooling water flowing through the circulation path F and the oil flowing through the circulation path L can be cooled by one radiator, thereby miniaturizing the vehicular temperature-control system.

Further, JP2017-087801A discloses a hybrid vehicle 100 including a second heat exchanger 50 configured to exchange heat between automatic transmission fluid (ATF) and long-life coolant (LLC). In the second heat exchanger 50, heat transfer plates 51 in which flow path holes 51*a* to 51*d* are provided for refrigerant flow are stacked, and gaskets 54 are inserted between two adjacent heat transfer plates 51. Each of the gaskets 54 inserted between the two adjacent heat transfer plates 51 includes: a fluid passage seal portion for surrounding a pair of upper and lower flow path holes 51*a* to 51*d* of the heat transfer plate 51 jointly; and a hole seal portion for surrounding each of the other pair of upper and lower flow path holes 51*a* to 51*d* for sealing. The heat transfer plates 51 are stacked via the gaskets 54 such that two adjacent heat transfer plates 51 are in opposite each other, thereby forming flow paths alternately A for the LLC and B for the ATF between the heat transfer plates 51. In the second heat exchanger 50, the LLC flowing through the flow path A and the ATF flowing through the flow path B exchange heat via the heat transfer plates 51.

In a heat exchanger configured to exchange heat between a non-conductive temperature-control medium (for example, oil such as ATF) and a conductive temperature-control medium (for example, cooling water such as LLC), when a diaphragm or the like between a flow path (hereinafter, also referred to as a "non-conductive temperature-control medium flow path") through which the non-conductive temperature-control medium flows and a flow path (hereinafter, also referred to as a "conductive temperature-control medium flow path") through which the conductive temperature-control medium flows is damaged, the conductive temperature-control medium may flow into the non-conductive temperature-control medium flow path from a damaged portion to enter the non-conductive temperature-control medium flowing through the non-conductive temperature-control medium flow path. If temperature control for an electric motor is performed with the non-conductive temperature-control medium containing the conductive temperature-control medium, the temperature-control medium may touch a live part to cause a short circuit, which can break down a vehicle.

In general, as a pump for circulating the non-conductive temperature-control medium, a pump (for example, a so-called mechanical pump) driven in accordance with driving of the vehicle. Therefore, when the vehicle is stopped, the pump for circulating the non-conductive temperature-control medium is also stopped, thereby decreasing liquid pressure of the non-conductive temperature-control medium in the non-conductive temperature-control medium flow path (that is, in the heat exchanger). If the liquid pressure in the non-conductive temperature-control medium flow path is reduced with the diaphragm or the like between the non-conductive temperature-control medium flow path and the conductive temperature-control medium flow path damaged, the conductive temperature-control medium is likely to flow into the non-conductive temperature-control medium flow path from a damaged portion. Therefore, for preventing the conductive temperature-control medium from entering the non-conductive temperature-control medium, it is preferable that the liquid pressure in the non-conductive temperature-control medium flow path be kept even when the vehicle is stopped.

SUMMARY

The present invention provides a vehicle capable of preventing a conductive temperature-control medium from entering a non-conductive temperature-control medium even when a heat exchanger configured to exchange heat between the non-conductive temperature-control medium and the conductive temperature-control medium is damaged.

A vehicle according to the present invention includes:
an electric motor; and
a temperature-control circuit through which a non-conductive temperature-control medium for temperature control for the electric motor circulates, in which
the temperature-control circuit includes:
a heat exchanger configured to exchange heat between the non-conductive temperature-control medium and a conductive temperature-control medium; and
a pump driven in accordance with driving of the vehicle to circulate the non-conductive temperature-control medium, and
the temperature-control circuit further includes a liquid pressure holding unit configured to hold liquid pressure of the non-conductive temperature-control medium in the heat exchanger equal to or higher than a predetermined pressure.

DESCRIPTION OF EMBODIMENTS

In the following, an embodiment of a vehicle according to the present invention will be described with reference to the drawings.

Vehicle

First, a vehicle V according to an embodiment of the present invention will be described with reference to FIG. 1.

Figure 1:
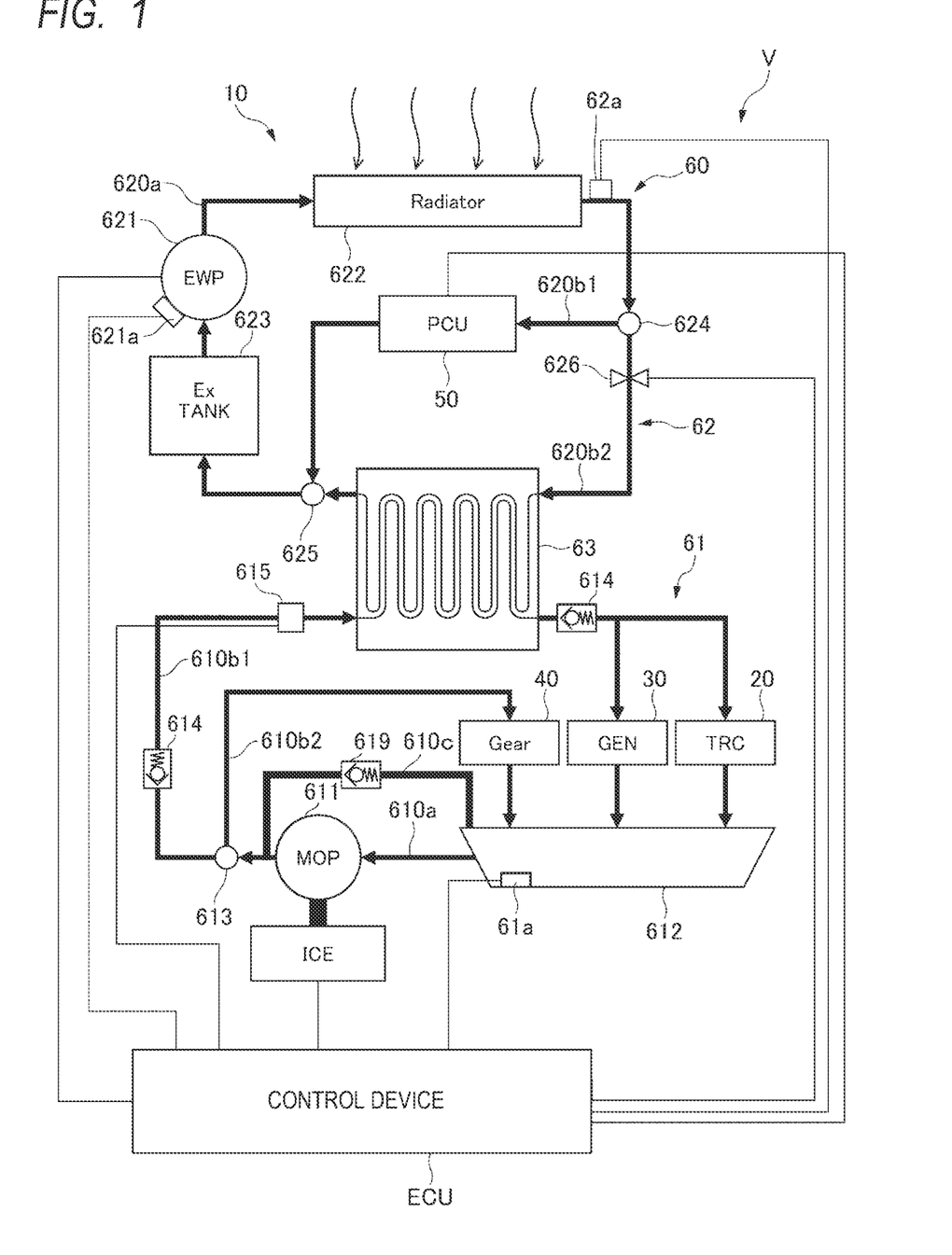
FIG. 1 is a block diagram of a vehicular temperature-control system provided in a vehicle according to an embodiment of the present invention.

As shown in FIG. 1, the vehicle V according to the present embodiment includes: a vehicular temperature-control system 10; an internal combustion engine ICE; a control device ECU; an electric motor 20; a generator 30; a transmission device 40; a power conversion device 50; and a temperature-control circuit 60.

The electric motor 20 is an electric machine configured to output power for driving the vehicle V using electric power stored in a power storage device (not shown) mounted on the vehicle V or generated by the generator 30. When the vehicle V brakes, the electric motor 20 may generate electric power from kinetic energy of drive wheels of the vehicle V to charge the power storage device.

The generator 30 is an electric machine configured to generate electric power from power of the internal combustion engine ICE to charge the power storage device or to supply the electric power to the electric motor 20.

The transmission device 40 is provided between the electric motor 20 and the drive wheels of the vehicle V and is configured to transmit power from the electric motor 20 to the drive wheels. The transmission device 40 is configured to reduce a speed of the electric motor 20 to a speed of the drive wheels and may be a gearbox.

The power conversion device 50 includes: a power drive unit (PDU, not shown) configured to convert the electric power output from the power storage device from direct current to alternating current to control input/output power of the electric motor 20 and the generator 30; and a voltage control unit (VCU, not shown) configured to step up voltage of the electric power output from the power storage device as necessary. The VCU may step down voltage of the electric power generated by the electric motor 20 when the electric motor 20 generates electric power during the braking of the vehicle V.

The temperature-control circuit 60 includes: a first temperature-control circuit 61 through which a non-conductive first temperature-control medium TCM1 circulates to control temperatures of the electric motor 20, the generator 30, and the transmission device 40; a second temperature-control circuit 62 through which a conductive second temperature-control medium TCM2 circulates to control a temperature of the power conversion device 50; and a heat exchanger 63 configured to exchange heat between the first temperature-control medium TCM1 and the second temperature-control medium TCM2. The non-conductive first temperature-control medium TCM1 is, for example, oil called automatic transmission fluid (ATF) capable of lubrication and temperature control for the electric motor 20, the generator 30, and the transmission device 40. The conductive second temperature-control medium TCM2 is, for example, cooling water called long-life coolant (LLC).

The first temperature-control circuit 61 is provided with a first pump 611 and a storage unit 612. The first pump 611 is a mechanical pump driven by power of the internal combustion engine ICE and a rotational force of an axle (not shown) of the vehicle V. That is, the first pump 611 is driven in accordance with driving of the vehicle V to circulate the first temperature-control medium TCM1 through the first temperature-control circuit 61. The storage unit 612 stores the first temperature-control medium TCM1 circulating through the first temperature-control circuit 61. The storage unit 612 is, for example, an oil pan provided at a bottom of a housing (not shown) accommodating the electric motor 20, the generator 30, and the transmission device 40.

The first temperature-control circuit 61 includes: a pumping flow path 610a in which the first pump 611 is provided; a first branch flow path 610b1 in which the electric motor 20 and the generator 30 are provided; a second branch flow path 610b2 in which the transmission device 40 is provided; and a branching portion 613 from which the first temperature-control circuit 61 branches into the first branch flow path 610b1 and the second branch flow path 610b2.

Specifically, an upstream end of the pumping flow path 610a is connected to the storage unit 612, and a downstream end of the pumping flow path 610a is connected to the branching portion 613. An upstream end of the first branch flow path 610b1 is connected to the branching portion 613, and a downstream end of the first branch flow path 610b1 is connected to the storage unit 612. An upstream end of the second branch flow path 610b2 is connected to the branching portion 613, and a downstream end of the second branch flow path 610b2 is connected to the storage unit 612.

Through the first branch flow path 610b1, the first temperature-control medium TCM1 can be supplied to the heat exchanger 63, the electric motor 20, and the generator 30. Specifically, in the first temperature-control circuit 61, the heat exchanger 63 is disposed upstream from the electric motor 20 and the generator 30, which are in the first branch flow path 610b1. Therefore in the first temperature-control circuit 61, two flow paths are formed in parallel for the first temperature-control medium TCM1 pumped by the first pump 611.

One is a flow path along which the first temperature-control medium TCM1 pumped by the first pump 611 flows through the first branch flow path 610b1 via the branching portion 613, is cooled by heat transfer with the second temperature-control medium TCM2 in the heat exchanger 63, is supplied to the electric motor 20 and the generator 30 for lubrication and temperature control for the electric motor 20 and the generator 30, and reaches the storage unit 612. The other is a flow path along which the first temperature-control medium TCM1 pumped by the first pump 611 flows through the second branch flow path 610b2 via the branching portion 613, is supplied to the transmission device 40 for lubrication and temperature control for the transmission device 40, and reaches the storage unit 612. The first temperature-control medium TCM1 reaching the storage unit 612 via either of the flow paths is supplied back to the first pump 611 via the pumping flow path 610*a* and is pumped again by the first pump 611. Accordingly, the first temperature-control medium TCM1 circulates through the first temperature-control circuit 61.

In the present embodiment, the first branch flow path 610*b*1 and the second branch flow path 610*b*2 are formed such that a flow rate of the first temperature-control medium TCM1 flowing through the first branch flow path 610*b*1 is larger than a flow rate of the first temperature-control medium TCM1 flowing through the second branch flow path 610*b*2.

The first temperature-control circuit 61 is provided with a first thermometer 61*a* configured to measure a temperature of the first temperature-control medium TCM1 circulating through the first temperature-control circuit 61. In the present embodiment, the first thermometer 61*a* is provided in the storage unit 612, which is an oil pan, to output a measured temperature of the first temperature-control medium TCM1 stored in the storage unit 612 to the control device ECU. Accordingly, the control device ECU can monitor, based on information from the first thermometer 61*a*, a temperature of the first temperature-control medium TCM1 stored in the storage unit 612, for example, to inform a user of the vehicle V that a temperature of the first temperature-control medium TCM1 exceeds a predetermined temperature.

The first branch flow path 610*b*1 is provided with liquid pressure holding units 614 configured to hold liquid pressure of the first temperature-control medium TCM1 in the heat exchanger 63 equal to or higher than a predetermined pressure. The predetermined pressure is, for example, liquid pressure of the second temperature-control medium TCM2 in the heat exchanger 50. In this case, even when the heat exchanger 50 is damaged, or when the diaphragm between the flow path through which the first temperature-control medium TCM1 flows and the flow path through which the second temperature-control medium TCM2 flows cracks, the second temperature-control medium TCM2 can be prevented from flowing into the flow path through which the first temperature-control medium TCM1 flows from a damaged portion.

In the present embodiment, the liquid pressure holding units 614 are a pair of valve devices provided on an upstream side (an inflow side of the heat exchanger 63) and a downstream side (an outflow side of the heat exchanger 63). The pair of valve devices are, for example, check valves.

When the first pump 611 is in a non-drive state or a low output drive state in accordance with the internal combustion engine ICE being in the non-drive state, or when the vehicle V is stopped, or in the low output drive state, or when the vehicle V is traveling at low speed, the pair of valve devices get in a closed state as liquid pressure of the first temperature-control medium TCM1 flowing through the first branch flow path 610*b*1 gets below the predetermined pressure. Accordingly, even when the vehicle V is stopped or when the vehicle V is traveling at low speed, liquid pressure of the first temperature-control medium TCM1 in the heat exchanger 63 can be held equal to or higher than the predetermined pressure.

The pair of valve devices of the liquid pressure holding units 614 may be, for example, electrically-actuated valves such as solenoid valves controlled by the control device ECU to be described later. In this case, when a speed of the vehicle V is below a threshold (for example, 10 [km/h]), the control device ECU controls and closes the pair of valve devices to restrict the first temperature-control medium TCM1 from flowing out from the heat exchanger 63. Accordingly, even when the vehicle V is stopped or when the vehicle V is traveling at low speed, liquid pressure of the first temperature-control medium TCM1 in the heat exchanger 63 can be held equal to or higher than the predetermined pressure.

One of the liquid pressure holding units 614 is provided between the branching portion 613 and the heat exchanger 63 in the first branch flow path 610*b*1. Accordingly, even when the first pump 611 is in the low output drive state, or when the vehicle V is traveling at low speed, the first temperature-control medium TCM1 can flow through the second branch flow path 610*b*2. Therefore, even when the first pump 611 is in the low output drive state, the first temperature-control medium TCM1 can be supplied to the transmission device 40 for lubrication for the transmission device 40.

An electric pump may be used as the first pump 611. In this case, even when the vehicle V is stopped or when the vehicle V is traveling at low speed, driving of the first pump 611 can be maintained by supplying electric power of a power storage device to the first pump 611 to hold liquid pressure of the first temperature-control medium TCM1 in the heat exchanger 63 equal to or higher than the predetermined pressure. However, in this case, in order to drive the first pump 611, power consumption of the vehicle V may increase, or a configuration of the vehicle V may be complicated and a manufacturing cost of the vehicle V may rise. Therefore, as described above, it is preferable that liquid pressure of the first temperature-control medium TCM1 in the heat exchanger 63 is held by the valve devices of the liquid pressure holding units 614 such as check valves and electrically-actuated valves. In this way, with a simple configuration, liquid pressure of the first temperature-control medium TCM1 in the heat exchanger 63 can be held with power consumption of the vehicle V kept down.

The first branch flow path 610*b*1 is provided with a pressure sensor 615 configured to measure liquid pressure of the first temperature-control medium TCM1 in the first branch flow path 610*b*1. Specifically, similarly to the heat exchanger 63, the pressure sensor 615 is provided between the pair of valve devices of the liquid pressure holding units 614. Accordingly, the pressure sensor 615 can measure liquid pressure of the first temperature-control medium TCM1 supplied to the heat exchanger 63, that is, liquid pressure of the first temperature-control medium TCM1 in the heat exchanger 63. The pressure sensor 615 is configured to output measured liquid pressure of the first temperature-control medium TCM1 to the control device ECU. As described later, the control device ECU can detect a leak of the first temperature-control medium TCM1 from the heat exchanger 63 or the liquid pressure holding unit 614 based on the measured liquid pressure of the pressure sensor 615.

The first temperature-control circuit 61 further includes a pressure adjustment circuit 610*c* whose upstream end is connected to the storage unit 612 and whose downstream end is connected to the pumping flow path 610*a* downstream from the first pump 611. The pressure adjustment circuit 610*c* is provided with a pressure adjustment valve 619. The pressure adjustment valve 619 may be a check valve or an electrically-actuated valve such as a solenoid valve. When liquid pressure of the first temperature-control medium TCM1 pumped from the first pump 611 exceed a predetermined upper limit pressure, the pressure adjustment valve 619 is opened to return some of the first temperature-control medium TCM1 pumped from the first pump 611 to the storage unit 612. Accordingly, the liquid pressure of the first temperature-control medium TCM1 flowing through the first branch flow path 610b1 and the second branch flow path 610b2 is kept below the upper limit pressure.

The second temperature-control circuit 62 is provided with a second pump 621, a radiator 622, and a storage tank 623. The second pump 621 is, for example, an electric pump driven by the electric power stored in the power storage device. The radiator 622 is disposed in the front of the vehicle V and is configured to cool the second temperature-control medium TCM2 using wind raised by traveling of the vehicle V. The storage tank 623 is a tank in which the second temperature-control medium TCM2 circulating through the second temperature-control circuit 62 is temporarily stored Even when cavitation occurs in the second temperature-control medium TCM2 circulating through the second temperature-control circuit 62, the cavitation disappears as the second temperature-control medium TCM2 circulating through the second temperature-control circuit 62 is temporarily stored in the storage tank 623.

The second temperature-control circuit 62 includes: a pumping flow path 620a in which the storage tank 623, the second pump 621, and the radiator 622 are provided downstream in this order: a branching portion 624: and a merging portion 625. Specifically, an upstream end of the pumping flow path 620a is connected to the merging portion 625, and a downstream end of the pumping flow path 620a is connected to the branching portion 624. The second temperature-control medium TCM2 stored in the storage tank 623 is pumped by the second pump 621 via the pumping flow path 620a and is cooled by the radiator 622.

The second temperature-control circuit 62 further includes: a first branch flow path 620b1 in which the power conversion device 50 is provided; and a second branch flow path 620b2 in which the heat exchanger 63 is provided Specifically, an upstream end of the first branch flow path 620b1 is connected to the branching portion 624, and a downstream end of the first branch flow path 620b1 is connected to the merging portion 625. An upstream end of the second branch flow path 620b2 is connected to the branching portion 624, and a downstream end of the second branch flow path 620b2 is connected to the merging portion 625.

In the present embodiment, a valve device 626 is provided upstream from the heat exchanger 63 in the second branch flow path 620b2 for adjusting a flow rate. The valve device 626 may be an on/off valve configured to switch the second branch flow path 620b2 between a fully open state and a fully closed state or a control valve capable of adjusting a flow rate of the second temperature-control medium TCM2 flowing through the second branch flow path 620b2. The valve device 626 is controlled by, for example, the control device ECU.

The second temperature-control medium TCM2 pumped by the second pump 621 and cooled by the radiator 622 in the pumping flow path 620a branches into the first branch flow path 620b1 and the second branch flow path 620b2 from the branching portion 624. The second temperature-control medium TCM2 flowing through the first branch flow path 620b1 cools the power conversion device 50 and merges with the second branch flow path 620b2 and the pumping flow path 620a at the merging portion 625. The second temperature-control medium TCM2 flowing through the second branch flow path 620b2 cools the first temperature-control medium TCM1 by heat transfer with the first temperature-control medium TCM1 in the heat exchanger 63 and merges with the first branch flow path 620b1 and the pumping flow path 620a at the merging portion 625. The second temperature-control medium TCM2 flowing through the first branch flow path 620b1 or the second temperature-control medium TCM2 flowing through the second branch flow path 620b2 is merged at the merging portion 625, flows through the pumping flow path 620a, and is temporarily stored in the storage tank 623. Then, the second temperature-control medium TCM2 stored in the storage tank 623 is supplied back to the second pump 621 through the pumping flow path 620a, thereby the second temperature-control medium TCM2 circulating through the second temperature-control circuit 62.

In the present embodiment, the first branch flow path 620b1 and the second branch flow path 620b2 are formed such that a flow rate of the second temperature-control medium TCM2 flowing through the first branch flow path 620b1 is larger than a flow rate of the second temperature-control medium TCM2 flowing through the second branch flow path 620b2.

The second temperature-control circuit 62 is provided with a second thermometer 62a configured to measure a temperature of the second temperature-control medium TCM2 circulating through the second temperature-control circuit 62. In the present embodiment, the second thermometer 62a is provided in the pumping flow path 620a between the radiator 622 and the branching portion 624 and is configured to measure a temperature of the second temperature-control medium TCM2 discharged from the radiator 622 to output a measured temperature to the control device ECU. Accordingly, the control device ECU can monitor, based on information from the second thermometer 62a, a temperature of the second temperature-control medium TCM2 discharged from the radiator 622, for example, to inform the user of the vehicle V that a temperature of the second temperature-control medium TCM2 exceeds the predetermined temperature.

In the first temperature-control circuit 61, after the first temperature-control medium TCM1 cools the electric motor 20, the generator 30, and the transmission device 40, a temperature of the first temperature control medium TCM1 stored in the storage unit 612 is about 100 [° C.]. The first temperature-control medium TCM1 of about 100 [° C.] is supplied to the heat exchanger 63.

Meanwhile, in the second temperature-control circuit 62, a temperature of the second temperature-control medium TCM2 cooled by the radiator 622 is about 40 [° C.]. Since the second temperature-control medium TCM2 supplied to the heat exchanger 63 does not pass through the power conversion device 50, which is a target of temperature control, the second temperature-control medium TCM2 of about 40 [° C.] is supplied to the heat exchanger 63.

The heat exchanger 63 exchanges heat between the first temperature-control medium TCM1 of about 100 [° C.] and the second temperature-control medium TCM2 of about 40 [° C.] that are supplied to the heat exchanger 63. Then, the first temperature-control medium TCM1 of about 80 [° C.] is discharged from the heat exchanger 63 to a downstream side of the first branch flow path 610b1 of the first temperature control circuit 61, and the second temperature-control medium TCM2 of about 70 [° C.] is discharged from the heat exchanger 63 to a downstream side of the second branch flow path 620b2 of the second temperature-control circuit 62.

Since the first temperature-control medium TCM1 is cooled in the heat exchanger 63 in this way, the temperature-control circuit 60 can cool the first temperature-control medium TCM1 without a radiator dedicated to the first temperature-control medium TCM1. Therefore, since the temperature-control circuit 60 can cool the first temperature-control medium TCM1 flowing through the first temperature-control circuit 61 and the second temperature-control medium TCM2 flowing through the second temperature-control circuit 62 by one radiator 622, the temperature-control circuit 60 can be miniaturized.

As described above, if the heat exchanger 63 is damaged, the first temperature-control medium TCM1 and the second temperature-control medium TCM2 is likely to flow into a flow path whose liquid pressure in the heat exchanger 63 is lower. Since liquid pressure of the first temperature-control medium TCM1 in the heat exchanger 63 is held equal to or higher than the predetermined pressure by the liquid pressure holding units 614 provided in the first branch flow path 610b1 of the first temperature-control circuit 61, even when the heat exchanger 63 is damaged, the second temperature-control medium TCM2 can be prevented from flowing into the first temperature-control circuit 61 and the conductive second temperature-control medium TCM2 can be prevented from entering the non-conductive first temperature-control medium TCM1 in the heat exchanger 63.

The control device ECU is configured to control the internal combustion engine ICE, the power conversion device 50, the second pump 621, the valve device 626, and the like. The control device ECU can be configured with, for example, a microcontroller including: a processor configured to perform various calculations: a storage device configured to store various types of information: an input/output device configured to control input and output of data between inside/outside the control device ECU: and the like. The control device ECU may be configured with a single microcontroller or microcontrollers.

A rotational speed sensor 621a configured to measure a rotational speed of the second pump 621 is attached to the second pump 621. The rotational speed sensor 621a is configured to output a measured rotational speed of the second pump 621 to the control device ECU Back to FIG. 1, if the first temperature-control medium TCM1 is ATF, viscosity of the first temperature-control medium TCM1 increases as a temperature of the first temperature-control medium TCM1 decreases. If the viscosity increases, friction loss in the electric motor 20 and the generator 30 increases since the first temperature-control medium TCM1 flows through the electric motor 20 and the generator 30, and output efficiency of the electric motor 20 and the generator 30 decreases. Therefore, when the electric motor 20 and the generator 30 are not at a high temperature and a temperature of the first temperature-control medium TCM1 is below a predetermined temperature and the first temperature-control medium TCM1 does not need to be cooled, for example, when the electric motor 20 and the generator 30 are started, it is preferable that the first temperature-control medium TCM1 be not cooled.

When a measured temperature of the first temperature-control medium TCM1 output from the first thermometer 61a is below the predetermined temperature, the control device ECU controls and completely closes the valve device 626 to block the second temperature-control medium TCM2 from flowing through the second branch flow path 620b2.

In this case, the second temperature-control medium TCM2 is not supplied to the heat exchanger 63. Therefore, heat transfer is not performed between the first temperature-control medium TCM1 and the second temperature-control medium TCM2, and the first temperature-control medium TCM1 is not cooled. Accordingly, it is possible to prevent the heat exchanger 63 from cooling the first temperature-control medium TCM1 when the first temperature-control medium TCM1 does not need to be cooled, thereby curbing increase in friction loss in the electric motor 20 and the generator 30 due to decrease in a temperature of the first temperature-control medium TCM1.

Leak Detection of First Temperature-control Medium TCM1 Performed by Control Device In the present embodiment, the control device ECU determines, based on liquid pressure measured by the pressure sensor 615, whether a leak of the first temperature-control medium TCM1 in the heat exchanger 63 or the liquid pressure holding unit 614 occurs. When it is determined that a leak of the first temperature-control medium TCM1 occurs, the control device ECU outputs information to the outside indicating that a leak of the first temperature-control medium TCM1 is detected. Accordingly, the control device ECU can inform the user of the vehicle V about the leak of the first temperature-control medium TCM1.

Specifically, when a leak of the first temperature-control medium TCM1 in the heat exchanger 63 or the liquid pressure holding unit 614 occurs, liquid pressure of the first temperature-control medium TCM1 to be held by the liquid pressure holding unit 614, that is, liquid pressure measured by the pressure sensor 615 fluctuates. Therefore, the control device ECU can detect, based on a liquid pressure measured by the pressure sensor 615, a leak of the first temperature-control medium TCM1 in the heat exchanger 63 or the liquid pressure holding unit 614 by monitoring whether there is fluctuation in liquid pressure of the first temperature-control medium TCM1.

Figure 2:
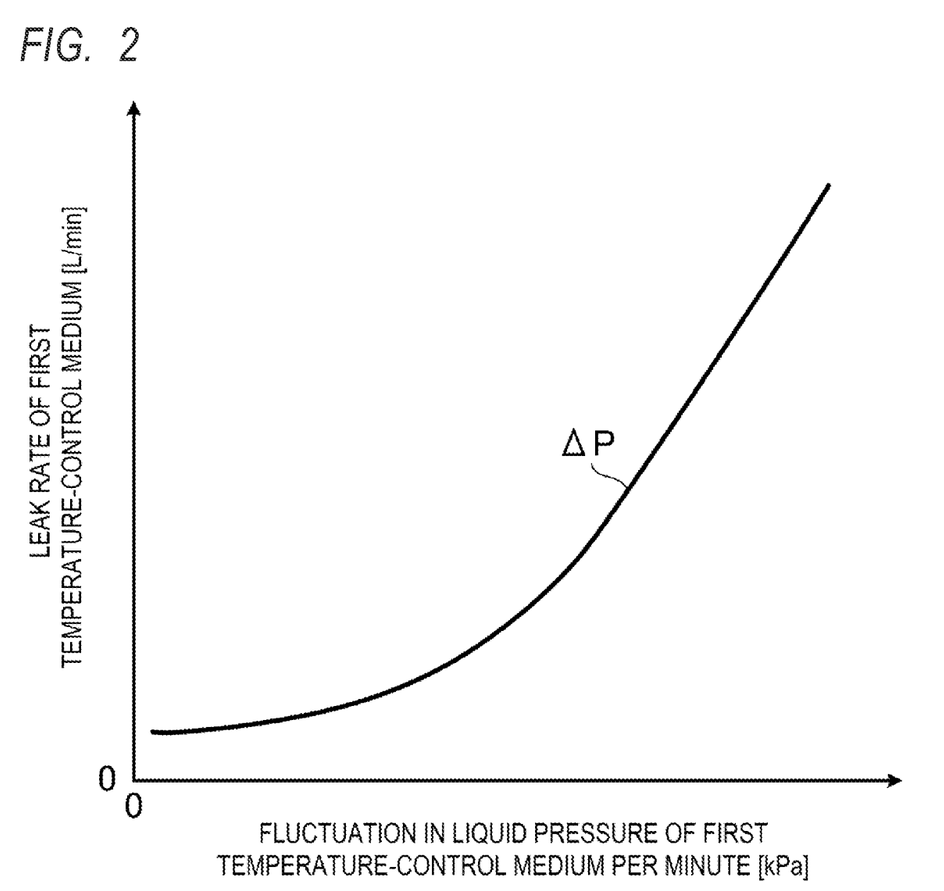
FIG. 2 is a diagram showing an example of a relationship between a leak of a first temperature-control medium from a heat exchanger or a liquid pressure holding unit and a fluctuation in a liquid pressure of the first temperature-control medium detected by a pressure sensor.

With reference to FIG. 2, an example of a relationship between a leak of the first temperature-control medium TCM1 in the heat exchanger 63 or in the liquid pressure holding unit 614 and fluctuation in liquid pressure of the first temperature-control medium TCM1 measured by the pressure sensor 615 will be described.

In FIG. 2, a vertical axis represents a leak rate [L/min] of the first temperature-control medium TCM1 in the heat exchanger 63 or the liquid pressure holding unit 614. In FIG. 2, a horizontal axis represents fluctuation in liquid pressure [kPa] of the first temperature-control medium TCM1 per, for example, minute. As indicated by a curve $\Delta P$ in FIG. 2, as a leak rate of the first temperature-control medium TCM1 increases, fluctuation in liquid pressure of the first temperature-control medium TCM1 increases.

Next, a leak of the first temperature-control medium TCM1 in the heat exchanger 63 and in the liquid pressure holding unit 614 will be specifically described.

The heat exchanger 63 is formed by stacking heat transfer plates. In the heat exchanger 63, a flow path through which the first temperature-control medium TCM1 or the second temperature-control medium TCM2 flows is formed between two adjacent heat transfer plates. A flow path through which the first temperature-control medium TCM1 flows and a flow path through which the second temperature-control medium TCM2 flows are alternately formed. Accordingly, the heat exchanger 63 enables heat transfer between the first temperature-control medium TCM1 and the second temperature-control medium TCM2.

A leak in the heat exchanger 63 occurs, for example, when a heat transfer plate of the heat exchanger 63 described above are broken and the first temperature-control medium TCM1 flows out from a broken portion. On the other hand, a leak in the liquid pressure holding unit 614 occurs when the first temperature-control medium TCM1 leaks from a slight gap of the liquid pressure holding unit 614 (that is, the valve device) in the closed state. Therefore, a leak rate of the first temperature-control medium TCM1 in the heat exchanger 63 is apt to be larger than that in the liquid pressure holding units 614.

Figure 3:
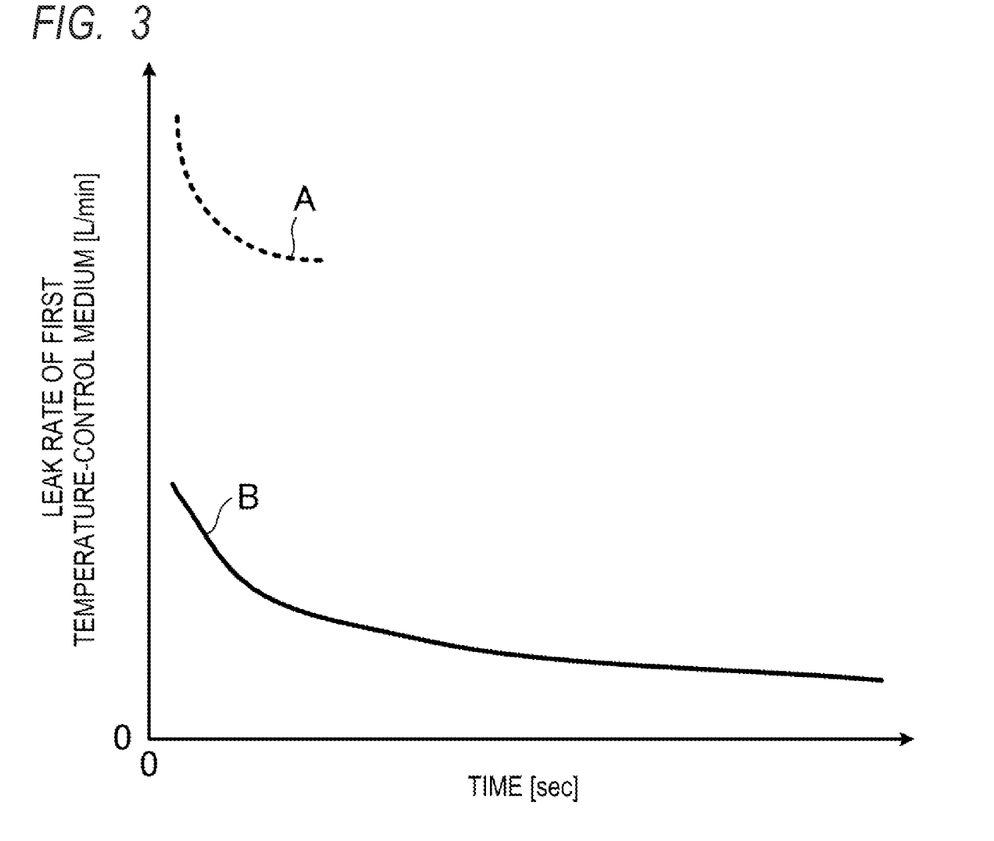
FIG. 3 is a diagram showing an example of fluctuation in liquid pressure of the first temperature-control medium when a leak occurs in the heat exchanger and of the first temperature-control medium when a leak occurs in the liquid pressure holding unit.

With reference to FIG. 3, an example of fluctuation in liquid pressure of the first temperature-control medium TCM1 when a leak in the heat exchanger 63 occurs and when a leak in the liquid pressure holding unit 614 occurs will be described.

In FIG. 3, a vertical axis represents a leak rate [L/min] of the first temperature-control medium TCM1. In FIG. 3, a horizontal axis represents time [sec].

In FIG. 3, a curve A indicates time variation of a leak rate of the first temperature-control medium TCM1 when a leak in the heat exchanger 63 occurs. A curve B in FIG. 3 indicates time variation of a leak rate of the first temperature-control medium TCM1 when a leak in the liquid pressure holding unit 614 occurs.

As indicated by the curves A and B in FIG. 3, since a leak in the heat exchanger 63 occurs mainly due to breakage of electric heater plates of the heat exchanger 63, a leak rate of the first temperature-control medium TCM1 in the exchanger 63 is apt to be larger than in the liquid pressure holding unit 614.

More specifically, when a leak from the heat exchanger 63 occurs, the first temperature-control medium TCM1 flows out quickly to the outside (for example, to the flow path through which the second temperature-control medium TCM2 flows) at a large leak rate. Then, when all of the first temperature-control medium TCM1 held between the pair of valve devices of the liquid pressure holding units 614 flows out to the outside, fluctuation in pressure measured by the pressure sensor 615 settles down and, for example, atmospheric pressure is measured by the pressure sensor 615.

Leak Detection Processing Performed by Control Device

Figure 4:
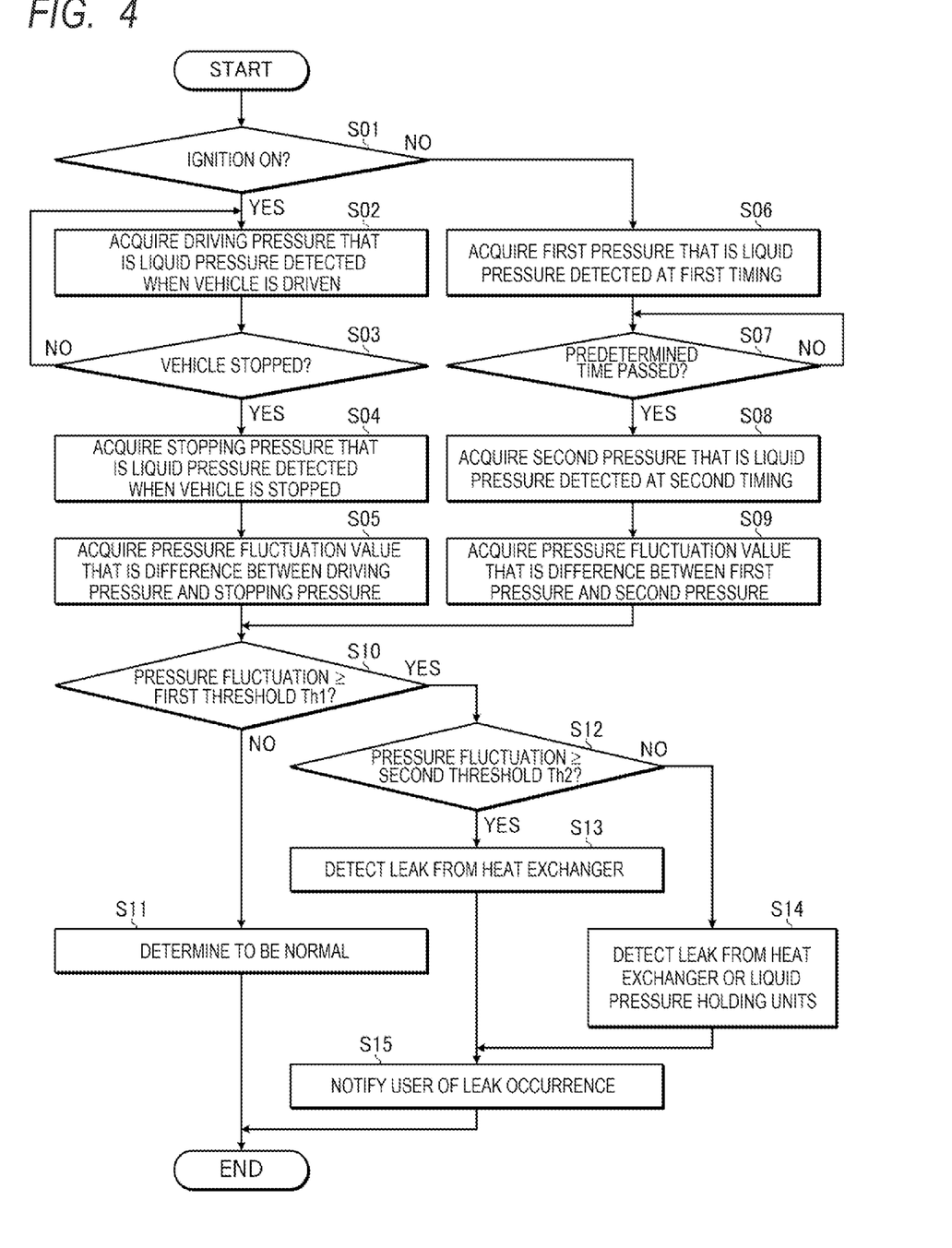
FIG. 4 is a flowchart showing an example of leak detection processing performed by a control device according to the present embodiment.

Next, an example of leak detection processing performed by the control device ECU in order to detect a leak of the first temperature-control medium TCM1 will be described with reference to FIG. 4. For example, the control device ECU, executes the leak detection processing shown in FIG. 4 at a predetermined timing. This leak detection processing can be implemented, for example, by a processor of the control device ECU executing a program stored in advance in the storage device or the like.

First, the control device ECU determines whether the vehicle V is on (step S01). When the vehicle V is on (YES in step S01), the control device ECU acquires driving pressure that is liquid pressure measured by the pressure sensor 615 when the vehicle V is traveling (for example, when a speed of the vehicle V is equal to or greater than a predetermined value greater than 0) (step S02).

Next, the control device ECU determines whether the vehicle V is stopped (that is, whether a speed of the vehicle V is 0) (step S03). When the vehicle V is not stopped (NO in step S03), the control device ECU returns to step S02. On the other hand, when the vehicle V is stopped (YES in step S03), the control device ECU acquires stopping pressure that is liquid pressure measured by the pressure sensor 615 when the vehicle V is stopped (for example, when a speed of the vehicle V is 0) (step S04).

Then, the control device ECU acquires pressure fluctuation that is difference (that is, the driving pressure—the stopping pressure) between the driving pressure acquired in step S02 and the stopping pressure acquired in step S04 (step S05) and proceeds to step S10.

The pressure fluctuation acquired in step SOS will be described further. The driving pressure fluctuates depending on a rotation speed of the internal combustion engine ICE or the axle (that is, a speed of the vehicle V) but ranges between the above-described predetermined pressure and a predetermined upper limit. Further, when a leak of the first temperature-control medium TCM1 does not occur, the stopping pressure is the above-described predetermined pressure because of the liquid pressure holding units 614. Therefore, when a leak of the first temperature-control medium TCM1 does not occur, the pressure fluctuation, which is the difference between the driving pressure and the stopping pressure, is within a predetermined range. On the other hand, when a leak of the first temperature-control medium TCM1 occurs, the stopping pressure is below the above-described predetermined pressure or is, for example, atmospheric pressure. Therefore, when a leak of the first temperature-control medium TCM1 occurs, the pressure fluctuation, which is the difference between the driving pressure and the stopping pressure, is apt to be larger than a leak of the first temperature-control medium TCM1 does not occur. Using such nature, as will be described later, the control device ECU can detect a leak of the first temperature-control medium TCM1 based on the pressure fluctuation, which is the difference between the driving pressure and the stopping pressure.

On the other hand, when the vehicle V is off (NO in step S01), the control device ECU acquires a first pressure that is liquid pressure measured by the pressure sensor 615 at this time (hereinafter, also referred to as a "first timing") (step S06). Then, the control device ECU waits for a predetermined time from the first timing (a second timing) (NO in step S07). At the second timing (YES in step S07), the control device ECU acquires a second pressure that is liquid pressure measured by the pressure sensor 615 at the second timing (step S08). The vehicle V is off at the second timing similarly to the first timing.

Then, the control device ECU acquires a pressure fluctuation that is difference (that is, the first pressure−the second pressure) between the first pressure acquired in step S06 and the second pressure acquired in step S08 (step S09) to proceed to step S10. As described above, when a leak of the first temperature-control medium TCM1 occurs, liquid pressure measured by the pressure sensor 615 gradually decreases. Therefore, when a leak of the first temperature-control medium TCM1 does not occur, the pressure fluctuation that is difference between the first pressure and the second pressure is substantially 0. However, when a leak of the first temperature-control medium TCM1 occurs, the pressure fluctuation that is the difference between the first pressure and the second pressure is larger than 0. Using such nature, as will be described later, the control device ECU can detect a leak of the first temperature-control medium TCM1 based on the pressure fluctuation that is difference between the first pressure and the second pressure.

Next, the control device ECU determines, based on the pressure fluctuation acquired in step S05 or S09 and a predetermined first threshold Th1 greater than 0, whether the pressure fluctuation exceeds the first threshold Th1 (step S10). The first threshold Th1 used in step S10 when step S05 is performed (that is, when the pressure fluctuation that is difference between the driving pressure and the stopping pressure is acquired) and the first threshold Th1 used in step S10 when step S09 is performed (that is, when the pressure fluctuation that is difference between the first pressure and the second pressure is acquired) may be different.

When the pressure fluctuation is less than the first threshold Th1 (NO in step S10), the control device ECU determines that the heat exchange is in a normal state, which means there is no leak of the first temperature-control medium TCM1 in the liquid pressure holding units 614 or the heat exchanger 63 (step S11) to end the current leak detection processing.

On the other hand, when the pressure fluctuation is equal to or greater than the first threshold Th1 (YES in step S10), the control device ECU determines whether the pressure fluctuation is equal to or greater than a second threshold Th2 greater than the first threshold Th1 (step S12). As described above, a leak rate of the first temperature-control medium TCM1 in the heat exchanger 63 is apt to be larger than in the liquid pressure holding units 614. Therefore, when a leak from the heat exchanger 63 occurs, fluctuation in liquid pressure of the first temperature-control medium TCM1 is apt to be larger than in the liquid pressure holding units 614. The second threshold Th2 is predetermined, for example, by a manufacturer of the control device ECU in order to determine whether a leak is in the heat exchanger 63 or in the liquid pressure holding units 614 using such nature. The second threshold Th2 used in step S12 when step S05 is performed (that is, when the pressure fluctuation that is difference between the driving pressure and the stopping pressure is acquired) and the second threshold Th2 used in step S12 when step S09 is performed (that is, when the pressure fluctuation that is difference between the first pressure and the second pressure is acquired) may be different.

When the pressure fluctuation exceeds the second threshold Th2 (Yes in step S12), the control device ECU determines that a leak of the first temperature-control medium TCM1 in the heat exchanger 63 (step S13) occurs to proceed to step S15. On the other hand, when the pressure fluctuation is less than the second threshold Th2 (NO in step S12), the control device ECU determines that a leak of the first temperature-control medium TCM1 in the heat exchanger 63 or the liquid pressure holding units 614 (step S14) occurs to proceed to step S15.

When it is determined in step S13 or step S14 that a leak occurs, the control device ECU informs the user of the vehicle V about the leak of the first temperature-control medium TCM1 (step S15) to end the current leak detection processing.

For example, when it is determined that a leak of the first temperature-control medium TCM1 in the heat exchanger 63 occurs, the control device ECU informs the user of the leak of the first temperature-control medium TCM1 in the heat exchanger 63 in step S15. When it is determined that a leak of the first temperature-control medium TCM1 in the heat exchanger 63 or the liquid pressure holding units 614 occurs, the control device ECU informs the user of the leak of the first temperature-control medium TCM1 in either the heat exchanger 63 or the liquid pressure holding units 614 in step S14.

In step S15, the control device ECU informs the user using, for example, a display, a warning lamp, or the like included in the vehicle V. When the vehicle V is off, it is likely that there is no user in the vehicle V Therefore, when the vehicle V is off (that is, when steps S06 to S09 are performed), the control device ECU may inform the user by transmitting a predetermined message or the like to a terminal device (for example, a smartphone) of the user registered in advance.

According to the present invention, a vehicle capable of preventing a conductive temperature-control medium from entering a non-conductive temperature-control medium even when a heat exchanger configured to exchange heat between the non-conductive temperature-control medium and the conductive temperature-control medium is damaged can be provided.

Although an embodiment of the present invention has been described above with reference to the drawings, it goes without saying that the present invention is not limited thereto. It will be obvious to those skilled in the art that various changes or modifications can be conceived within the scope of the claims, and it is understood that the various changes and modifications belong to the technical scope of the present invention. The components in the embodiment described above may be combined arbitrarily within the gist of the invention.

In the present description, at least the following are described. In the parentheses, the corresponding components elements or the like in the above-described embodiment are shown as an example. However, the present invention is not limited thereto.

(1) A vehicle (vehicle V) includes:
an electric motor (electric motor 20); and
a temperature-control circuit (first temperature-control circuit 61) through which a non-conductive temperature-control medium (first temperature-control medium TCM1) for temperature control for the electric motor circulates, in which
the temperature-control circuit includes:
a heat exchanger (heat exchanger 63) configured to exchange heat between the non-conductive temperature-control medium and a conductive temperature-control medium (second temperature-control medium TCM2 in second temperature-control circuit 62); and
a pump (first pump 611) driven in accordance with driving of the vehicle to circulate the non-conductive temperature-control medium, and
the temperature-control circuit further includes a liquid pressure holding unit (liquid pressure holding units 614) configured to hold liquid pressure of the non-conductive temperature-control medium in the heat exchanger equal to or higher than a predetermined pressure.

According to (1), since the temperature-control circuit includes the liquid pressure holding unit, the conductive temperature-control medium can be prevented from entering the non-conductive temperature-control medium even when the heat exchanger is damaged.

(2) the vehicle according to (1) further includes:
a power transmission device (transmission device 40) that is provided between the electric motor and a drive wheel and is configured to transmit power from the electric motor to the drive wheel, in which
the temperature-control circuit includes:
a first flow path (first branch flow path 610*b*1) through which oil (first temperature-control medium TCM1) is supplied to the heat exchanger and the electric motor as the non-conductive temperature control medium;
a second flow path (second branch flow path 610*b*2) through which the oil is supplied to the power transmission device; and
a branching portion (branching portion 613) from which the temperature-control circuit branches into the first flow path and the second flow path, and
the liquid pressure holding unit is provided between the branching portion and the heat exchanger in the first flow path.

According to (2), even when the pump is in the low output drive state, oil can be supplied to the power transmission device for lubrication for the power transmission device.

(3) The vehicle according to (1), in which
the liquid pressure holding unit is configured with check valves provided on inflow and outflow sides of the heat exchanger.

According to (3), even when the pump is in the non-drive state or the low output drive state, liquid pressure of the non-conductive temperature-control medium in the heat exchanger can be held equal to or higher than the predetermined pressure.

(4) The vehicle according to (1), in which
the liquid pressure holding unit is configured with electrically-actuated valves provided on inflow and outflow sides of the heat exchanger,
the vehicle further includes a control device configured to control the electrically-actuated valves, and
the control device controls the electrically-actuated valve to restrict outflow of the non-conductive temperature-control medium from the heat exchanger when a speed of the vehicle is equal to or less than a threshold.

According to (4), even when the pump is in the non-drive state or the low output drive state, liquid pressure of the non-conductive temperature-control medium in the heat exchanger can be held equal to or higher than the predetermined pressure.

(5) The vehicle according to (1) further includes:
a pressure sensor (pressure sensor 615) configured to measure liquid pressure of the non-conductive temperature-control medium in a flow path through which the non-conductive temperature-control medium is supplied to the heat exchanger in the temperature-control circuit; and
a control device (control device ECU) configured to detect, based on the liquid pressure of the non-conductive temperature-control medium measured by the pressure sensor, a leak of the non-conductive temperature-control medium in the liquid pressure holding unit or the heat exchanger, in which
the control device is configured to determine that the leak occurs when pressure difference between a driving pressure that is liquid pressure measured when the vehicle is driven and a stopping pressure that is liquid pressure measured when the vehicle is stopped is equal to or greater than a first threshold.

According to (5), since the control device can detect, based on the liquid pressure measured by the pressure sensor, a leak of the non-conductive temperature-control medium in the heat exchanger or the liquid pressure holding unit, the user of the vehicle can be informed about the leak.

(6) The vehicle according to (1) further includes:
a pressure sensor (pressure sensor 615) configured to measure liquid pressure of the non-conductive temperature-control medium in a flow path through which the non-conductive temperature-control medium is supplied to the heat exchanger in the temperature-control circuit; and
a control device (control device ECU) configured to detect, based on the liquid pressure of the non-conductive temperature-control medium measured by the pressure sensor, a leak of the non-conductive temperature-control medium in the liquid pressure holding unit or the heat exchanger, in which
the control device is configured to determine that the leak occurs when a pressure difference between a first pressure that is liquid pressure measured at a first timing when the vehicle is stopped and a second pressure that is liquid pressure measured at a second timing after the first timing when the vehicle is stopped is equal to or greater than a first threshold.

According to (6), since the control device can detect, based on liquid pressure measured by the pressure sensor, a leak of the non-conductive temperature-control medium in the heat exchanger or the liquid pressure holding unit, the user of the vehicle can be informed about the leak.

(7) The vehicle according to (5) or (6), in which
the control device determines that the leak occurs in the heat exchanger when the pressure difference is equal to or greater than a second threshold greater than the first threshold.

According to (7), since a leak in the heat exchanger can be detected, the user of the vehicle can be informed about the leak.

The invention claimed is:
1. A vehicle comprising:
an electric motor;
a power transmission device that is provided between the electric motor and a drive wheel and is configured to transmit power from the electric motor to the drive wheel; and
a temperature-control circuit through which a non-conductive temperature-control medium for temperature control for the electric motor circulates, wherein
the temperature-control circuit includes:
a heat exchanger configured to exchange heat between the non-conductive temperature-control medium and a conductive temperature-control medium;
a pump driven in accordance with driving of the vehicle to circulate the non-conductive temperature-control medium,
a liquid pressure holding unit configured to hold liquid pressure of the non-conductive temperature-control medium in the heat exchanger equal to or higher than a predetermined pressure,
a first flow path through which oil is supplied to the heat exchanger and the electric motor as the non-conductive temperature control medium;
a second flow path through which the oil is supplied to the power transmission device; and
a branching portion from which the temperature-control circuit branches into the first flow path and the second flow path, and
the liquid pressure holding unit is provided between the branching portion and the heat exchanger in the first flow path.

2. A vehicle comprising:
an electric motor; and
a temperature-control circuit through which a non-conductive temperature-control medium for temperature control for the electric motor circulates, wherein
the temperature-control circuit includes:
a heat exchanger configured to exchange heat between the non-conductive temperature-control medium and a conductive temperature-control medium;
a pump driven in accordance with driving of the vehicle to circulate the non-conductive temperature-control medium; and
a liquid pressure holding unit configured to hold liquid pressure of the non-conductive temperature-control medium in the heat exchanger equal to or higher than a predetermined pressure, and
the liquid pressure holding unit is configured with check valves provided on inflow and outflow sides of the heat exchanger.

3. A vehicle comprising:
an electric motor; and
a temperature-control circuit through which a non-conductive temperature-control medium for temperature control for the electric motor circulates, wherein
the temperature-control circuit includes:
- a heat exchanger configured to exchange heat between the non-conductive temperature-control medium and a conductive temperature-control medium;
- a pump driven in accordance with driving of the vehicle to circulate the non-conductive temperature-control medium; and
- a liquid pressure holding unit configured to hold liquid pressure of the non-conductive temperature-control medium in the heat exchanger equal to or higher than a predetermined pressure, the liquid pressure holding unit is configured with electrically-actuated valves provided on inflow and outflow sides of the heat exchanger,
the vehicle further includes a control device configured to control the electrically-actuated valves, and
the control device controls the electrically-actuated valve to restrict outflow of the non-conductive temperature-control medium from the heat exchanger when a speed of the vehicle is equal to or less than a threshold.

4. A vehicle comprising:
an electric motor;
a temperature-control circuit through which a non-conductive temperature-control medium for temperature control for the electric motor circulates, wherein the temperature-control circuit includes:
- a heat exchanger configured to exchange heat between the non-conductive temperature-control medium and a conductive temperature-control medium;
- a pump driven in accordance with driving of the vehicle to circulate the non-conductive temperature-control medium, and
- a liquid pressure holding unit configured to hold liquid pressure of the non-conductive temperature-control medium in the heat exchanger equal to or higher than a predetermined pressure, a pressure sensor configured to measure liquid pressure of the non-conductive temperature-control medium in a flow path through which the non-conductive temperature-control medium is supplied to the heat exchanger in the temperature-control circuit; and
a control device configured to detect, based on the liquid pressure of the non-conductive temperature-control medium measured by the pressure sensor, a leak of the non-conductive temperature-control medium in the liquid pressure holding unit or the heat exchanger, wherein
the control device is configured to determine that the leak occurs when pressure difference between a driving pressure that is liquid pressure measured when the vehicle is driven and a stopping pressure that is liquid pressure measured when the vehicle is stopped is equal to or greater than a first threshold.

5. A vehicle comprising:
an electric motor;
a temperature-control circuit through which a non-conductive temperature-control medium for temperature control for the electric motor circulates, wherein the temperature-control circuit includes:
- a heat exchanger configured to exchange heat between the non-conductive temperature-control medium and a conductive temperature-control medium;
- a pump driven in accordance with driving of the vehicle to circulate the non-conductive temperature-control medium, and
- a liquid pressure holding unit configured to hold liquid pressure of the non-conductive temperature-control medium in the heat exchanger equal to or higher than a predetermined pressure, a pressure sensor configured to measure liquid pressure of the non-conductive temperature-control medium in a flow path through which the non-conductive temperature-control medium is supplied to the heat exchanger in the temperature-control circuit; and
a control device configured to detect, based on the liquid pressure of the non-conductive temperature-control medium measured by the pressure sensor, a leak of the non-conductive temperature-control medium in the liquid pressure holding unit or the heat exchanger, wherein
the control device is configured to determine that the leak occurs when pressure difference between a first pressure that is liquid pressure measured at a first timing when the vehicle is stopped and a second pressure that is liquid pressure measured at a second timing after the first timing when the vehicle is stopped is equal to or greater than a first threshold.

6. The vehicle according to claim 4, wherein
the control device determines that the leak occurs in the heat exchanger when the pressure difference is equal to or greater than a second threshold greater than the first threshold.

7. The vehicle according to claim 5, wherein
the control device determines that the leak occurs in the heat exchanger when the pressure difference is equal to or greater than a second threshold greater than the first threshold.

* * * * *